(12) United States Patent
Fujii et al.

(10) Patent No.: US 10,190,669 B2
(45) Date of Patent: Jan. 29, 2019

(54) POWER TRANSMISSION DEVICE FOR VEHICLE

(71) Applicant: TOYOTA JIDOSHA KABUSHIKI KAISHA, Toyota-shi, Aichi-ken (JP)

(72) Inventors: Kota Fujii, Nissin (JP); Atsushi Tabata, Okazaki (JP); Haruhisa Suzuki, Miyoshi (JP); Koichi Okuda, Toyota (JP); Hiroyuki Tateno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/421,957

(22) Filed: Feb. 1, 2017

(65) Prior Publication Data

US 2017/0227109 A1 Aug. 10, 2017

(30) Foreign Application Priority Data

Feb. 9, 2016 (JP) ................................. 2016-022481

(51) Int. Cl.
*F16H 57/00* (2012.01)
*F16H 57/12* (2006.01)
(Continued)

(52) U.S. Cl.
CPC ......... *F16H 57/0006* (2013.01); *F16H 57/12* (2013.01); *B60K 6/365* (2013.01);
(Continued)

(58) Field of Classification Search
CPC ...... F16H 57/0006; F16H 57/12; F16H 3/728; F16H 2200/0043; F16H 2200/2066;
(Continued)

(56) References Cited

U.S. PATENT DOCUMENTS

| 4,828,423 A | * | 5/1989 | Cramer, Jr. ........... F16D 1/0835 |
| | | | 403/326 |
| 4,981,390 A | * | 1/1991 | Cramer, Jr. ........... F16D 1/0835 |
| | | | 403/355 |

(Continued)

FOREIGN PATENT DOCUMENTS

| CN | 103328244 A | 9/2013 |
| CN | 103403379 A | 11/2013 |

(Continued)

*Primary Examiner* — Zakaria Elahmadi
(74) *Attorney, Agent, or Firm* — Oliff PLC

(57) ABSTRACT

A tolerance ring is interposed between an output side rotary shaft and a rotor shaft. For this reason, even in a case where a backlash formed in a spline fitting portion between the output side rotary shaft and the rotor shaft is not eliminated, the rotary shafts of both of the output side rotary shaft and the rotor shaft are held by the tolerance ring without a backlash, and rattling noise can be suppressed. An oil supply groove for supplying a lubricant between an annular portion of the tolerance ring and the output side rotary shaft is provided inside an annular groove formed in the output side rotary shaft. With this, it is possible to suppress degradation of the durability of the tolerance ring without performing special processing on the tolerance ring.

4 Claims, 9 Drawing Sheets

(51) Int. Cl.
  *B60K 6/365* (2007.10)
  *B60K 6/442* (2007.10)
  *B60K 6/547* (2007.10)
  *F16H 3/72* (2006.01)

(52) U.S. Cl.
  CPC .............. *B60K 6/442* (2013.01); *B60K 6/547* (2013.01); *B60Y 2200/92* (2013.01); *B60Y 2306/09* (2013.01); *B60Y 2400/73* (2013.01); *F16H 3/728* (2013.01); *F16H 2200/0043* (2013.01); *F16H 2200/201* (2013.01); *F16H 2200/2043* (2013.01); *F16H 2200/2066* (2013.01); *F16H 2200/2082* (2013.01); *Y10S 903/911* (2013.01); *Y10S 903/919* (2013.01)

(58) Field of Classification Search
  CPC .... F16H 3/663; F16H 45/02; F16H 2200/006; F16H 2200/0086; B60K 6/365; B60K 6/442; B60K 6/547; B60Y 2200/92; B60Y 2306/09; B60Y 2400/73; F16D 3/64; F16D 13/58; F16D 25/10
  See application file for complete search history.

(56) References Cited

U.S. PATENT DOCUMENTS

| | | | | |
|---|---|---|---|---|
| 5,496,216 A | * | 3/1996 | Rohrle | ................... F16F 15/139 464/160 |
| 6,755,746 B2 | * | 6/2004 | Barnley | ................... F16D 1/08 403/359.5 |
| 7,367,574 B2 | * | 5/2008 | Leitner | ................... B60R 3/02 280/163 |
| 7,958,637 B2 | * | 6/2011 | Hughes | ................ F16D 1/0817 29/895 |
| 8,567,579 B2 | * | 10/2013 | Nakamura | ............... F16H 41/30 192/3.25 |
| 8,955,658 B2 | * | 2/2015 | Ideshio | .................... F16H 41/30 192/3.26 |
| 9,719,579 B2 | * | 8/2017 | Torii | ....................... F16H 3/663 |
| 2003/0073502 A1 | | 4/2003 | Barnley et al. | |
| 2004/0154422 A1 | * | 8/2004 | Menjak | ................... B62D 1/105 74/440 |
| 2008/0173512 A1 | * | 7/2008 | Kaneko | .................... F16H 45/02 192/3.29 |
| 2013/0105267 A1 | | 5/2013 | Nakamura et al. | |
| 2013/0283972 A1 | | 10/2013 | Yamamoto et al. | |
| 2013/0315655 A1 | * | 11/2013 | Nias | ......................... F16C 11/04 403/119 |
| 2013/0324345 A1 | * | 12/2013 | Asakura | .................. F16D 7/021 475/198 |
| 2014/0205374 A1 | * | 7/2014 | Nias | ......................... F16D 9/06 403/367 |
| 2014/0254962 A1 | * | 9/2014 | Tecza | ................... F16C 32/0402 384/91 |
| 2014/0342872 A1 | | 11/2014 | Imai et al. | |
| 2015/0001025 A1 | * | 1/2015 | Slayne | .................. F16D 1/0835 192/56.1 |
| 2016/0084305 A1 | * | 3/2016 | Fujita | ...................... F16C 33/102 384/291 |
| 2016/0348765 A1 | * | 12/2016 | Ishikawa | ................... F16H 7/08 |
| 2017/0016490 A1 | * | 1/2017 | Azumai | .................. F16D 25/123 |
| 2017/0016515 A1 | * | 1/2017 | Torii | ....................... F16H 3/663 |
| 2017/0219018 A1 | * | 8/2017 | Kurachi | .................. F16D 7/021 |
| 2017/0314650 A1 | * | 11/2017 | Jinnai | ....................... F16H 3/663 |
| 2017/0314659 A1 | * | 11/2017 | Michikoshi | ............. F16D 7/021 |
| 2018/0119746 A1 | * | 5/2018 | Torii | ........................ F16D 3/64 |

FOREIGN PATENT DOCUMENTS

| | | | |
|---|---|---|---|
| DE | 102006001302 A1 | | 7/2007 |
| JP | 04362346 A | * | 12/1992 |
| JP | H04-362346 A | | 12/1992 |
| JP | 2003-139154 A | | 5/2003 |
| JP | 2003-139157 A | | 5/2003 |
| JP | 3617824 B2 | | 2/2005 |
| JP | 2012-052638 A | | 3/2012 |
| JP | 2012-197927 A | | 10/2012 |
| JP | 2013-505411 A | | 2/2013 |
| WO | 2011/036126 A1 | | 3/2011 |
| WO | 2013/080311 A1 | | 6/2013 |

\* cited by examiner

FIG. 2

| | ENGAGEMENT DEVICE | | | | | |
|---|---|---|---|---|---|---|
| | C1 | C2 | B0 | B1 | B2 | F1 |
| 1st | O | | | | (O) | O |
| 2nd | O | | | O | | |
| 3rd | O | O | | | | |
| 4th | | O | | O | | |
| R | O | | | | O | |
| DUAL DRIVE | | | O | | | |

O ENGAGEMENT
(O) ENGAGEMENT DURING ENGINE BRAKE

POWER TRANSMISSION DEVICE FOR VEHICLE

INCORPORATION BY REFERENCE

The disclosure of Japanese Patent Application No. 2016-022481 filed on Feb. 9, 2016 including the specification, drawings and abstract is incorporated herein by reference in its entirety.

BACKGROUND

1. Technical Field

The present disclosure relates to a power transmission device which is provided in a vehicle. In particular, the present disclosure relates to improvement of a configuration for suppressing rattling noise caused by a backlash on the power transmission path.

2. Description of Related Art

It is known that rattling noise occurs due to collision between teeth facing each other with a backlash between rotary shafts constituting a power transmission device provided in a vehicle, and measures to suppress rattling noise are suggested. For example, in a power transmission device of International Publication No. WO 2013/080311 (WO 2013/080311 A), a rotor shaft of a second electric motor constitutes a part of a power transmission path from an engine to drive wheels. Accordingly, since the directly transmitted torque of the engine is transmitted to the rotor shaft, even if the torque of the second electric motor is nearly zero, and during driving of the engine, a spline tooth of the rotor shaft is pressed against a spline tooth of the other rotary shaft. Accordingly, a backlash between the spline tooth of the rotor shaft and the spline tooth of the other rotary shaft is eliminated, and rattling noise is suppressed.

On the other hand, in the power transmission device of WO 2013/080311 A, while a backlash on an upstream side (engine side) of the rotor shaft of the second electric motor on the power transmission path can be eliminated, a backlash which is formed between an input shaft of a transmission arranged on a downstream side (drive wheel side) of the second electric motor and the rotor shaft of the second electric motor cannot be eliminated. Accordingly, if torque which is input to the transmission becomes nearly zero, rattling noise due to a backlash formed between the rotor shaft of the second electric motor and the input shaft of the transmission may occur.

As measures to suppress rattling noise, a case where a tolerance ring is provided between the rotor shaft of the second electric motor and the input shaft of the transmission, and relative rotation of the rotor shaft of the second electric motor and the input shaft of the transmission is regulated is considered. That is, a case where the tolerance ring is interposed between the rotor shaft and the input shaft, and in a situation in which input torque to the input shaft does not exceed a predetermined value, the rotor shaft and the input shaft are rotated integrally by the tolerance ring is considered.

SUMMARY

However, even in a configuration in which the tolerance ring is provided, the tolerance ring repeatedly slightly slides (for example, slides in a rotation direction within a range in which a backlash is not eliminated) with respect to the rotary shaft (for example, the input shaft of the transmission) due to fluctuation in torque transmitted from the rotor shaft of the second electric motor to the input shaft of the transmission. For example, in a traveling state in which a traveling drive power required for a vehicle is small, or the like, a case where the torque transmitted to the input shaft of the transmission through the rotor shaft of the second electric motor slightly fluctuates due to slight fluctuation in engine torque, or the like is exemplified. In a situation in which slight slide of the tolerance ring is repeated, abrasion may occur in a slide portion of the tolerance ring, or the like, and the durability of the tolerance ring may be degraded.

As means for increasing the durability of the tolerance ring, a case where processing is performed for forming an oil supply hole in the tolerance ring to increase lubricity, or the like, is considered; however, in this case, there is a concern that shortage of rigidity of the tolerance ring is caused.

The disclosure provides a structure capable of suppressing degradation of the durability of a tolerance ring provided to suppress rattling noise without performing special processing (processing which may cause shortage of rigidity, or the like) on the tolerance.

A first aspect of the disclosure is a power transmission device for a vehicle. The power transmission device includes a first rotary shaft, a second rotary shaft, a spline fitting portion, and a tolerance ring. The spline fitting portion is configured to spline-fit the first rotary shaft and the second rotary shaft in a part of a power transmission path from a power source to a drive wheel. The tolerance ring is provided at a place at which the first rotary shaft is inserted into the second rotary shaft and which is different from the spline fitting portion. The tolerance ring includes an annular portion and a protrusion. The annular portion is configured to come into contact with one of the first rotary shaft and the second rotary shaft. The protrusion is configured to come into contact with the other one of the first rotary shaft and the second rotary shaft. The one of the first rotary shaft and the second rotary shaft is provided with a groove. The groove is configured to supply a lubricant to a region of the tolerance ring where the annular portion comes into contact.

According to the power transmission device, the tolerance ring is provided between the first rotary shaft and the second rotary shaft, whereby both of the first rotary shaft and the second rotary shaft are held by the tolerance ring without a backlash even in a case where a backlash between the first rotary shaft and the second rotary shaft is not eliminated. Accordingly, it is possible to suppress rattling noise in the spline fitting portion. The groove (the groove for supplying the lubricant to the region with the annular portion of the tolerance ring in contact) is provided in the rotary shaft with the annular portion of the tolerance ring in contact between the first rotary shaft and the second rotary shaft, whereby the lubricant is supplied between the annular portion of the tolerance ring and the rotary shaft. For this reason, even if a situation in which the tolerance ring repeatedly slightly slides (slides in a rotation direction) with respect to the rotary shaft (the rotary shaft with the annular portion of the tolerance ring in contact) is caused, it is possible to suppress abrasion of the annular portion of the tolerance ring, and to suppress degradation of the durability of the tolerance ring. That is, it is possible to suppress degradation of the durability of the tolerance ring without performing special processing on the tolerance ring.

In the power transmission device, the groove may extend along a circumferential direction of the one of the first rotary shaft and the second rotary shaft.

According to the power transmission device, the lubricant can be supplied between the annular portion of the tolerance ring and the rotary shaft (the rotary shaft with the annular portion of the tolerance ring in contact) over a wide range in the circumferential direction of the tolerance ring. For this reason, it is possible to sufficiently exert the effect of suppressing abrasion of the annular portion of the tolerance ring, and to reliably suppress degradation of the durability of the tolerance ring.

In the power transmission device, the groove may be provided over the entire circumference in the circumferential direction of the one of the first rotary shaft and the second rotary shaft.

According to the power transmission device, the groove is provided over the entire circumference in the circumferential direction of the rotary shaft (the rotary shaft with the annular portion of the tolerance ring in contact), whereby it is possible to supply the lubricant over the entire circumference between the annular portion of the tolerance ring and the rotary shaft even if the tolerance ring is misaligned in the circumferential direction with respect to the rotary shaft. For this reason, it is possible to suppress abrasion of the annular portion of the tolerance ring without being affected by the misalignment.

In the power transmission device, the tolerance ring may have at least one notch in a part in the circumferential direction.

According to the power transmission device, the notch of the tolerance ring functions as a discharge port of the lubricant supplied between the tolerance ring and the rotary shaft (the rotary shaft with the annular portion of the tolerance ring in contact). For this reason, discharging of foreign substances, such as abrasion powder, from the notch is effectively performed, and cooling of the tolerance ring is satisfactorily performed by the flow of the lubricant. With this, it is possible to suppress degradation of the durability of the tolerance ring.

In the power transmission device, the one of the first rotary shaft and the second rotary shaft may have oil supply holes, the oil supply holes may be configured to supply a lubricant to the groove, and the number of oil supply holes may be larger than the number of the at least one notch of the tolerance ring.

In a case where the position of the notch of the tolerance ring overlaps the position of one oil supply hole, the lubricant supplied from the oil supply hole may not be supplied to the groove and may be discharged from the notch. However, according to the power transmission device, since the number of oil supply holes is larger than the number of notches, the positions of other oil supply holes do not overlap the position of the notch. For this reason, the lubricant supplied from the oil supply holes (the oil supply holes not overlapping the position of the notch) is satisfactorily supplied to the groove. Accordingly, even if the tolerance ring is misaligned in the circumferential direction with respect to the rotary shaft (the rotary shaft with the annular portion of the tolerance ring in contact), it is possible to supply the lubricant between the annular portion of the tolerance ring and the rotary shaft, and to suppress abrasion of the annular portion of the tolerance ring. Furthermore, when assembling the tolerance ring in the first rotary shaft, an operation to assemble while confirming such that the position of the notch does not overlap the positions of the oil supply holes is not required, and assembling operability is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is an engagement operation table of an automatic transmission;

DETAILED DESCRIPTION OF EMBODIMENTS

Figure 1:
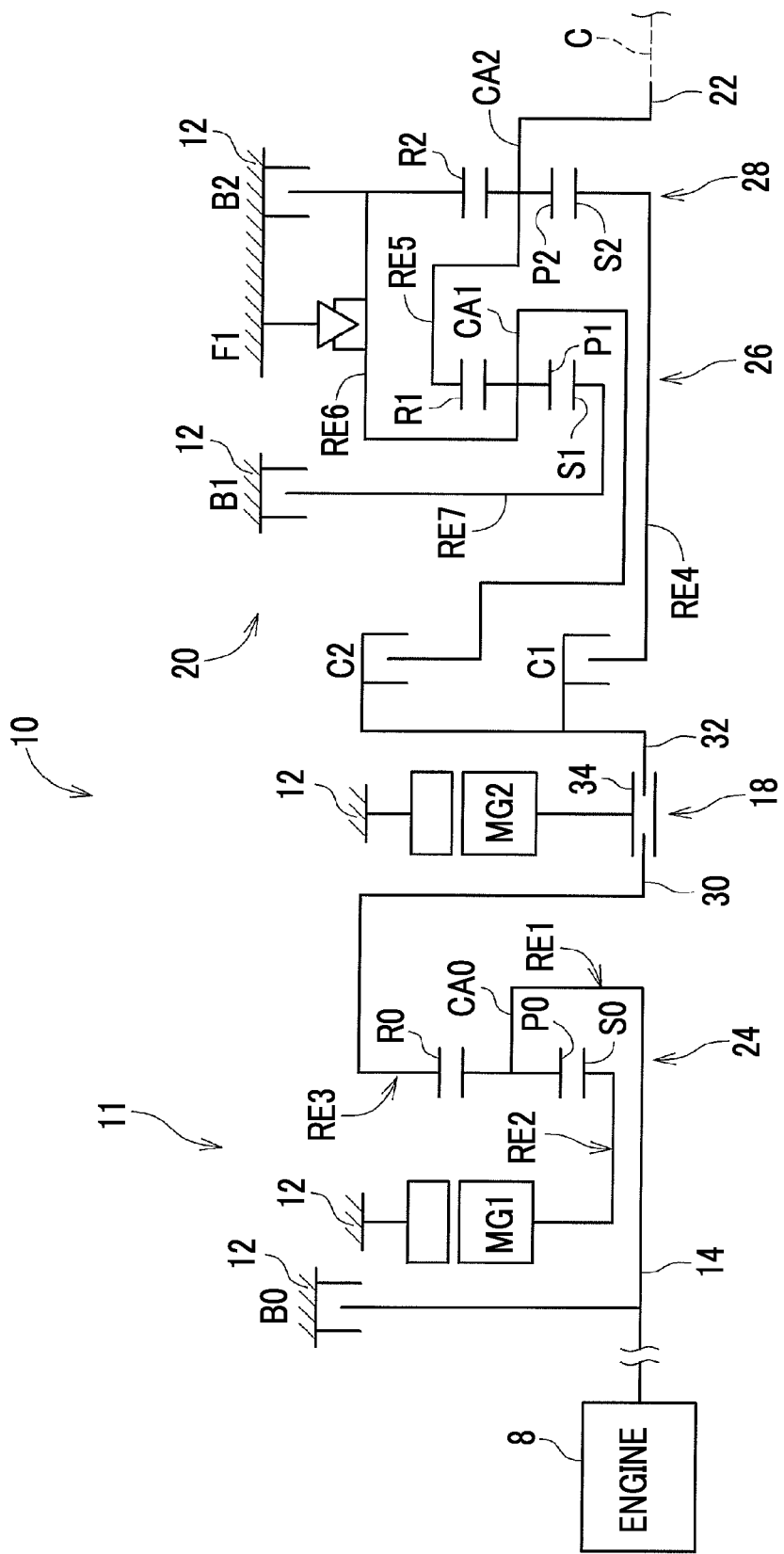
FIG. 1 is a schematic view illustrating a power transmission device for a hybrid vehicle to which the disclosure is applied.

Hereinafter, an embodiment of the disclosure will be described in detail referring to the drawings.

FIG. 1 is a schematic view illustrating a power transmission device 10 for a hybrid vehicle to which the disclosure is applied. In FIG. 1, the power transmission device 10 includes, in series on a common axis C in a transmission case 12 (hereinafter, referred to as a case 12) as a non-rotating member attached to a vehicle body, an input shaft 14 as an input rotating member, a differential unit 11 (electric differential unit) as a continuously variable gear shift unit coupled to the input shaft 14 directly or indirectly through a pulsation absorbing damper (pulsation attenuation device) (not shown) or the like, an automatic transmission 20 coupled in series through a transmission member 18 on a power transmission path from the differential unit 11 to drive wheels (not shown), and an output shaft 22 as an output rotating member coupled to the automatic transmission 20. The power transmission device 10 is suitably used in, for example, a front-engine rear-drive (FR) vehicle in which the power transmission device 10 is longitudinally mounted on the vehicle. The power transmission device 10 is provided between an engine 8 which is an internal combustion engine, such as a gasoline engine or a diesel engine, as a power source for traveling coupled to the input shaft 14 directly or indirectly through the pulsation absorbing damper (not shown), and the drive wheels. An output (power) from the engine 8 is transmitted to the drive wheels through a differential gear device (final reduction gear) (not shown) constituting a part of the power transmission path, an axle, and the like in this order.

In this way, in the power transmission device 10 of this embodiment, the engine 8 and the differential unit 11 are directly coupled to each other. The engine 8 and the differential unit 11 being directly coupled to each other means that coupling is made without passing a hydrodynamic power transmission device, such as a torque converter or fluid coupling. For example, coupling is made through the pulsation absorbing damper or the like.

The differential unit 11 includes a first electric motor MG1 which functions as a differential electric motor to control a differential state of the input shaft 14 and the transmission member 18 (output shaft), a differential planetary gear device 24 as a differential mechanism to distribute the output of the engine 8 to the first electric motor MG1 and the transmission member 18, a second electric motor MG2 which is coupled so as to rotate integrally with the transmission member 18 functioning as an output shaft, and a fixed brake B0 for stopping the rotation of the input shaft 14. The first electric motor MG1 and the second electric motor MG2 of this embodiment are so-called motor generators having a power generation function. The first electric motor MG1 includes at least a generator (power generation) function for generating a reaction force, and the second electric motor MG2 includes at least a motor (electric motor) function for functioning as an electric motor for traveling configured to output a drive power as a drive power source for traveling.

The differential planetary gear device 24 functioning as a differential mechanism is a single pinion type, and includes a sun gear S0, a pinion gear P0, a carrier CA0, and a ring gear R0 as rotating elements.

In the differential planetary gear device 24, the carrier CA0 is coupled to the input shaft 14, that is, the engine 8 to constitute a first rotating element RE1, the sun gear S0 is coupled to the first electric motor MG1 to constitute a second rotating element RE2, and the ring gear R0 is coupled to the transmission member 18 to constitute a third rotating element RE3. The differential planetary gear device 24 configured as above distributes the output of the engine 8 to the first electric motor MG1 and the transmission member 18. Electric energy generated by the first electric motor MG1 is stored or the second electric motor MG2 is rotationally driven by a distributed part of the output of the engine 8. Accordingly, the differential unit 11 functions as an electric differential device. For example, the differential unit 11 is in a so-called continuously variable gear shift state, whereby the rotation speed of the transmission member 18 is continuously changeable regardless of the rotation speed of the engine 8.

The automatic transmission 20 is a planetary gear type multistage transmission which includes a single pinion type first planetary gear device 26 and a single pinion type second planetary gear device 28, and functions as a stepped automatic transmission. The first planetary gear device 26 includes a first sun gear S1, a first pinion gear P1, a first carrier CA1, and a first ring gear R1. The second planetary gear device 28 includes a second sun gear S2, a second pinion gear P2, a second carrier CA2, and a second ring gear R2.

In the automatic transmission 20, the first sun gear S1 is selectively coupled to the case 12 through a first brake B1. In the automatic transmission 20, the first carrier CA1 and the second ring gear R2 are coupled integrally to be coupled to the transmission member 18 through a second clutch C2 and to be coupled to the case 12 through a second brake B2. In the automatic transmission 20, the first ring gear R1 and the second carrier CA2 are coupled integrally to be coupled to the output shaft 22. In the automatic transmission 20, the second sun gear S2 is selectively coupled to the transmission member 18 through a first clutch C1. In the automatic transmission 20, the first carrier CA1 and the second ring gear R2 are coupled to the case 12 through a one-way clutch F1.

In the automatic transmission 20, a plurality of gear shift stages are selectively established according to the engagement state of the first clutch C1, the second clutch C2, the fixed brake B0, the first brake B1, and the second brake B2. The relationship between the engagement state of the respective clutches C1, C2 and the respective brakes B0, B1, B2 and the gear shift stage established by the engagement state is shown in an engagement operation table of FIG. 2.

When driving the vehicle with the first electric motor MG1 and the second electric motor MG2, the fixed brake B0 is engaged. If the fixed brake B0 is engaged, the input shaft 14 stops rotation, and the reaction torque of the first electric motor MG1 is output from the transmission member 18. Accordingly, driving with the first electric motor MG1 in addition to the second electric motor MG2 is enabled. The automatic transmission 20 is brought into a neutral state by releasing the first clutch C1, the second clutch C2, the first brake B1, and the second brake B2.

Figure 3:
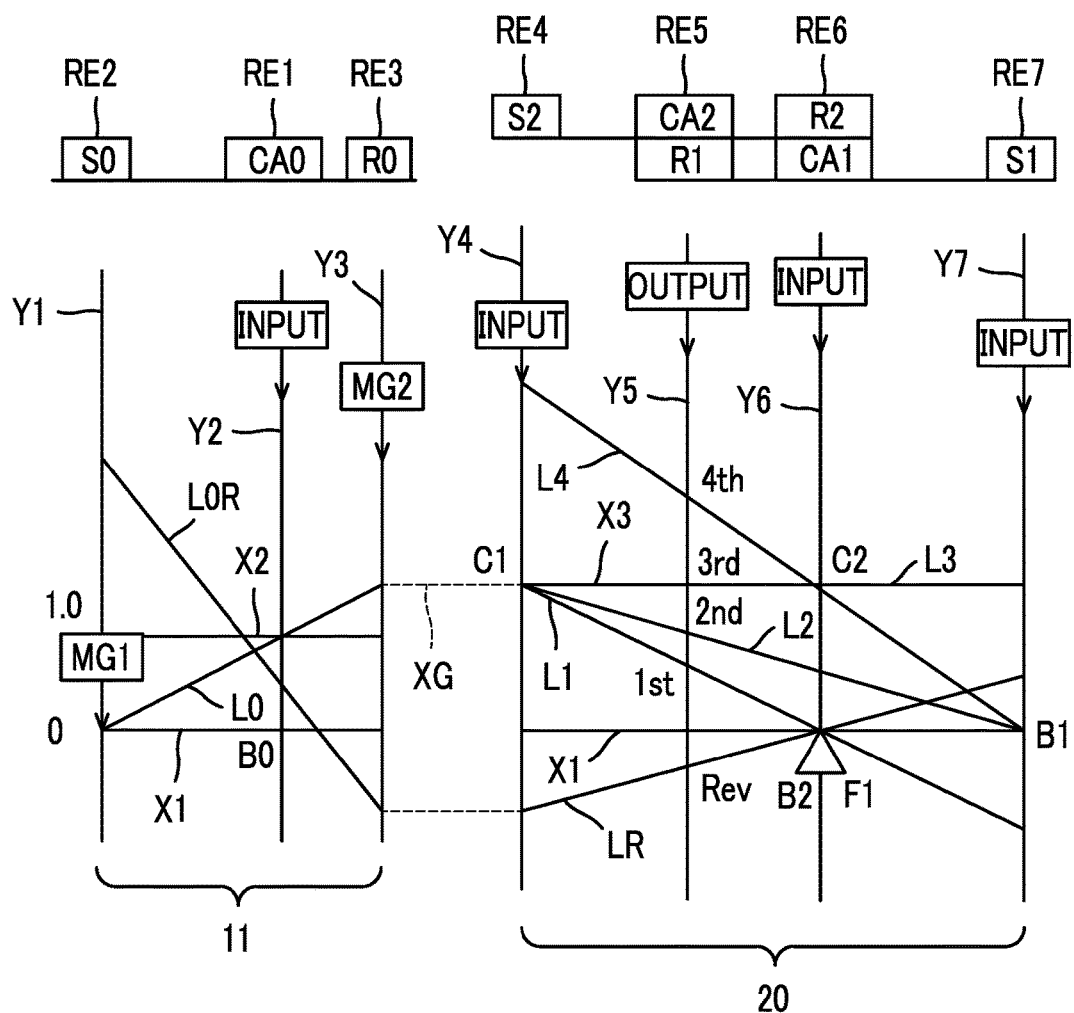
FIG. 3 is a collinear diagram showing the relative relationship of rotation speeds of respective rotating elements having different engaged states for each gear shift stage on a straight line in the power transmission device.

FIG. 3 is a collinear diagram showing the relative relationship of the rotation speeds of the respective rotating elements having different engaged states for each gear shift stage in the power transmission device 10. The collinear diagram of FIG. 3 is two-dimensional coordinates which have a horizontal axis indicating the relationship of the gear ratios of the respective planetary gear devices 24, 26, 28 and a vertical axis indicating a relative rotation speed. Of three horizontal lines, a low horizontal line X1 indicates a rotation speed of zero, an upper horizontal line X2 indicates a rotation speed of "1.0", that is, a rotation speed Ne of the engine 8 coupled to the input shaft 14, and X3 indicates a rotation speed of the third rotating element RE3 from the differential unit 11 to the automatic transmission 20.

Vertical lines Y1, Y2, Y3 shown in FIG. 3 correspond to three elements of the differential planetary gear device 24 constituting the differential unit 11. The vertical lines Y1, Y2, Y3 respectively indicate the relative rotation speeds of the second rotating element RE2, the first rotating element RE1, and the third rotating element RE3. The intervals between the vertical lines Y1, Y2, Y3 are determined according to the gear ratio of the differential planetary gear device 24.

Four vertical lines Y4, Y5, Y6, Y7 of the automatic transmission 20 respectively indicate the relative rotation speeds of the second sun gear S2 corresponding to a fourth rotating element RE4, the first ring gear R1 and the second carrier CA2 corresponding to a fifth rotating element RE5, the first carrier CA1 and the second ring gear R2 corresponding to a sixth rotating element RE6, and the first sun gear S1 corresponding to the seventh rotating element RE7. The intervals between the vertical lines Y4, Y5, Y6, Y7 are respectively determined according to the gear ratios of the first and second planetary gear devices 26, 28.

As shown in the collinear diagram of FIG. 3, the differential unit 11 is in a differential state in which the first rotating element RE1 to the third rotating element RE3 are relatively rotatable. In a case where the rotation speed of the ring gear R0 indicated at an intersection of a straight line L0 and the vertical line Y3 is bound by a vehicle speed V to be constant, the rotation speed of the first electric motor MG1 is controlled. With this, if the rotation speed of the sun gear S0 indicated at an intersection of the straight line L0 and the vertical line Y1 increases or decreases, the rotation speed of the carrier CA0 indicated at an intersection of the straight line L0 and the vertical line Y2, that is, the engine rotation speed Ne increases or decreases.

If the sun gear S0 has the same rotation speed as the engine rotation speed Ne by controlling the rotation speed of the first electric motor MG1 such that the gear shift ratio of the differential unit 11 is fixed to "1.0", the straight line L0 matches the horizontal line X2. Then, the ring gear R0, that is, the transmission member 18 is rotated at the same rotation speed as the engine rotation speed Ne. Alternatively, if the rotation speed of the sun gear S0 becomes zero by controlling the rotation speed of the first electric motor MG1 such that the gear shift ratio of the differential unit 11 is fixed to a value smaller than "1.0", for example, about "0.7", the transmission member 18 is rotated at a speed higher than the engine rotation speed Ne. For example, the second electric motor MG2 is rotated reversely, as indicated by a straight line L0R, the transmission member 18 coupled to the ring gear R0 is rotated at a rotation speed lower than zero.

In the automatic transmission 20, a stepped gear shift including a forward gear shift of a first gear shift stage 1st to a fourth gear shift stage 4th or a reverse gear shift stage can be established. In FIG. 3, 1st represents the relationship of the rotation speeds of the respectively rotating elements in the first gear shift stage. 2nd represents the relationship of the rotation speeds of the respective rotating elements in the second gear shift stage. 3rd represents the relationship of the rotation speeds of the respective rotating elements in the third gear shift stage. 4th represents the relationship of the rotation speeds of the respective rotating elements in the fourth gear shift stage. Rev represents the relationship of the rotation speeds of the respective rotating elements in the reverse gear shift stage.

Figure 4:
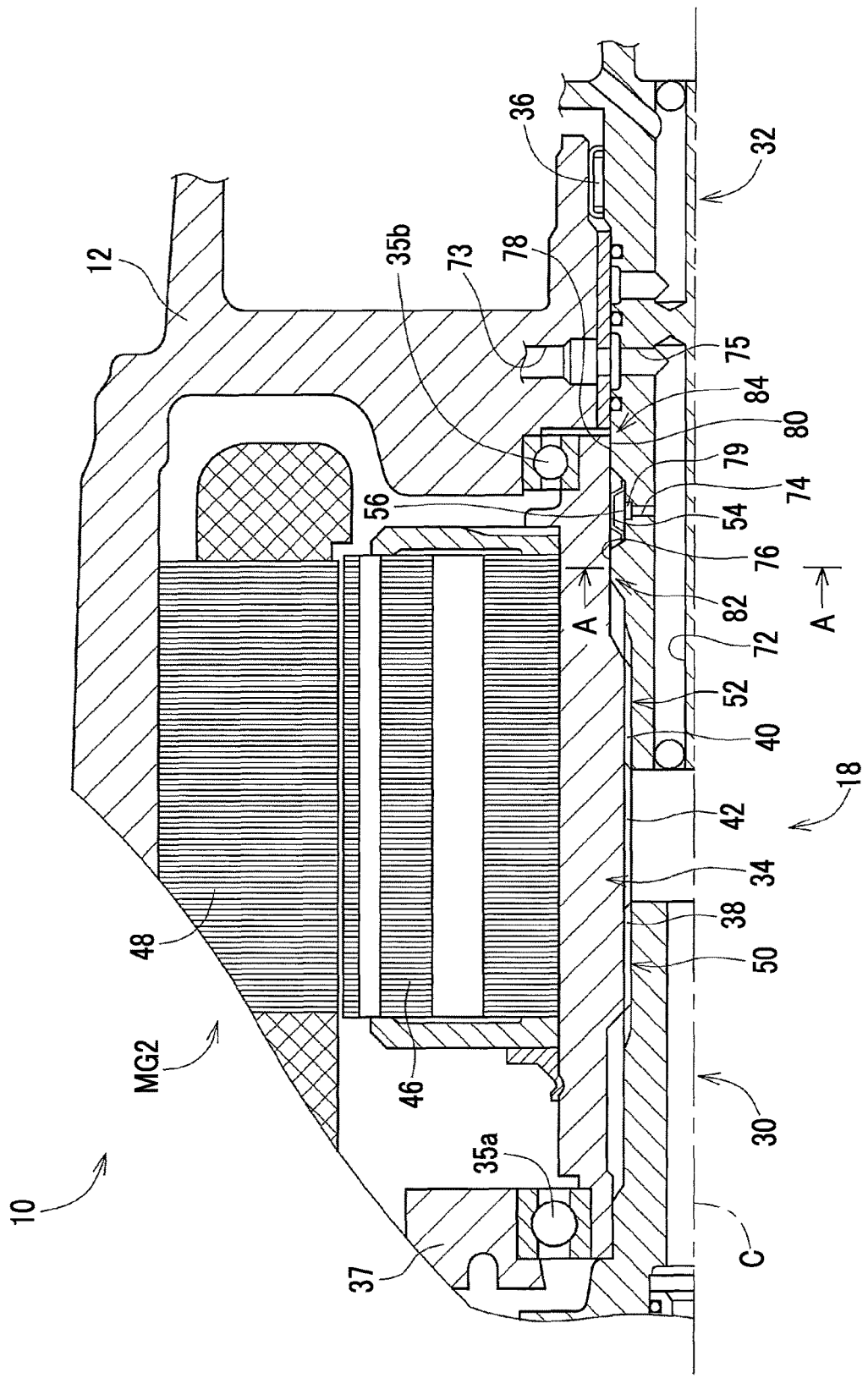
FIG. 4 is a sectional view showing a part of the power transmission device.

FIG. 4 is a sectional view showing a part of the power transmission device 10. FIG. 4 shows the section of each of the transmission member 18 primarily functioning as the output shaft of the differential unit 11 and the second electric motor MG2 coupled to the transmission member 18. The transmission member 18 includes an input side rotary shaft 30 coupled to the ring gear R0 of the differential planetary gear device 24, an output side rotary shaft 32 functioning as the input shaft of the automatic transmission 20, and a rotor shaft 34 of the second electric motor MG2. All of the input side rotary shaft 30, the output side rotary shaft 32, and the rotor shaft 34 are arranged around the same axis C. The output side rotary shaft 32 corresponds to a first rotary shaft of the disclosure, and the rotor shaft 34 corresponds to a second rotary shaft of the disclosure.

The input side rotary shaft 30 and the output side rotary shaft 32 are arranged at positions separated from each other in the direction of the axis C when viewed from the outside in a radial direction, and the rotor shaft 34 of the second electric motor MG2 couples the input side rotary shaft 30 and the output side rotary shaft 32.

The rotor shaft 34 of the second electric motor MG2 is formed in a cylindrical shape and is arranged so as to cover the outer circumferential end portions (tip portions) of the input side rotary shaft 30 and the output side rotary shaft 32 facing each other in the direction of the axis C (such that the respective rotary shafts 30, 32 are inserted). The rotor shaft 34 is configured such that one end in the direction of the axis C is rotatably supported by an electric motor cover 37 coupled to the case 12 through a bearing 35a, and the other end in the direction of the axis C is rotatably supported by the case 12 through a bearing 35b. The output side rotary shaft 32 is rotatably supported by the case 12 through a bearing 36 and the like.

In the input side rotary shaft 30, outer circumferential teeth 38 are formed in an outer circumferential portion on a side (in the drawing, the right side) facing the output side rotary shaft 32 in the direction of the axis C. In the output side rotary shaft 32, outer circumferential teeth 40 having the same shape as the outer circumferential teeth 38 of the input side rotary shaft 30 are formed in an outer circumferential portion on a side (in the drawing, the left side) facing the input side rotary shaft 30 in the direction of the axis C. On the inner circumferential side of the cylindrical rotor shaft 34 of the second electric motor MG2, inner circumferential teeth 42 which are spline-fitted to the outer circumferential teeth 38 and the outer circumferential teeth 40 are formed. The outer circumferential teeth 38 of the input side rotary shaft 30 and the inner circumferential teeth 42 of the rotor shaft 34 are spline-fitted, and the outer circumferential teeth 40 of the output side rotary shaft 32 and the inner circumferential teeth 42 of the rotor shaft 34 are spline-fitted. The outer circumferential tooth 38 of the input side rotary shaft 30 and the inner circumferential tooth 42 of the rotor shaft 34 are spline-fitted to each other, whereby a spline fitting portion 50 which couples the input side rotary shaft 30 and the rotor shaft 34 so as to transmit power is formed. In the previous spline fitting portion 50, a backlash is formed between the outer circumferential tooth 38 and the inner circumferential tooth 42, and the relative rotation of the input side rotary shaft 30 and the rotor shaft 34 is permitted between the backlashes. The outer circumferential teeth 40 of the output side rotary shaft 32 and the inner circumferential teeth 42 of the rotor shaft 34 are spline-fitted to each other, whereby a spline fitting portion 52 which couples the output side rotary shaft 32 and the rotor shaft 34 so as to transmit power is formed. In the spline fitting portion 52, a backlash is formed between the outer circumferential tooth 40 and the inner circumferential tooth 42, and the relative rotation of the output side rotary shaft 32 and the rotor shaft 34 is permitted between the backlashes. The spline fitting portion 52 corresponds to a spline fitting portion of the disclosure. In this way, the power transmission device 10 according to this embodiment includes the spline fitting portion 52 formed by spline-fitting the output side rotary shaft (first rotary shaft) 32 and the rotor shaft (second rotary shaft) 34 in a part of the power transmission path from the engine 8 as a power source to the drive wheels.

A rotor 46 of the second electric motor MG2 is fixed to the outer circumferential portion of the rotor shaft 34, and a stator 48 of the second electric motor MG2 is arranged on an outer circumferential side of the rotor 46.

In the power transmission device 10 configured as above, if the torque (output) of the engine 8 is transmitted to the input side rotary shaft 30, the torque is transmitted to the rotor shaft 34 through the spline fitting portion 50 between the input side rotary shaft 30 and the rotor shaft 34. In addition, the torque is transmitted to the output side rotary shaft 32 through the spline fitting portion 52 of the rotor shaft 34 and the output side rotary shaft 32. Accordingly, even in a state in which torque is not output from the second electric motor MG2, a backlash which is formed in the spline fitting portion 50 of the input side rotary shaft 30 and the rotor shaft 34 is eliminated.

On the other hand, in a case where the torque input to the automatic transmission 20 becomes zero, since a backlash which is formed between the rotor shaft 34 and the output side rotary shaft 32 is not eliminated, rattling noise may occur between the rotor shaft 34 and the output side rotary shaft 32. In order to eliminate this problem, in this embodiment, a tolerance ring 54 is interposed between the rotor shaft 34 and the output side rotary shaft 32 in the vicinity of the spline fitting portion 52.

Figure 5:
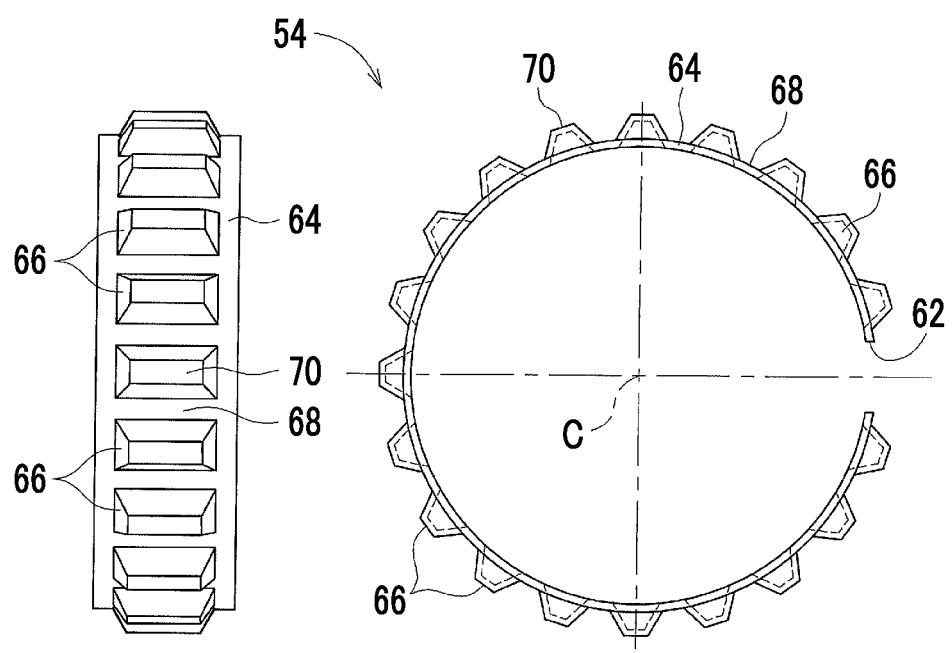
FIG. 5 is a diagram showing the shape of a tolerance ring.

An annular groove 56 is formed in an outer circumferential portion of the output side rotary shaft 32, and the tolerance ring 54 is accommodated in an annular space formed by the annular groove 56. FIG. 5 shows the shape of the tolerance ring 54.

The tolerance ring 54 shown in FIG. 5 is made of a metal (for example, spring steel), and is formed in a substantially annular shape with a notch 62 in a portion in a circumferential direction. The tolerance ring 54 includes an annular portion 64 formed in a substantially annular shape and a plurality of outward protrusions 66 protruding from the annular portion 64 to the outside in a radial direction. The annular portion 64 has the notch 62 in a portion in the circumferential direction and can be thus elastically deformed and fitted to the output side rotary shaft 32 in advance. The outward protrusions 66 correspond to a protrusion of the disclosure.

The outward protrusions 66 are arranged at the center in a width direction of the annular portion 64 (in the left view of FIG. 5, a right-left direction), and are in contact with the rotor shaft 34 after assembling. The outward protrusions 66 are arranged equiangularly in the circumferential direction, and a flat surface 68 is formed between adjacent outward protrusions 66, 66 in the circumferential direction. The flat surface 68 functions as a part of the annular portion 64. The outward protrusions 66 are formed in a trapezoidal shape when viewed in the direction of the axis C, and a contact surface 70 which is in contact with the inner circumferential surface of the rotor shaft 34 after assembling is formed on the outside in the radial direction. The tolerance ring 54 is molded by pressing one steel plate, and as indicated by a broken line in FIG. 5, a space is formed on the rear side of each of the outward protrusions 66. The hardness of the tolerance ring 54 is set to a value lower than the hardness of the outer circumferential surface of the output side rotary shaft 32 and the inner circumferential surface of the rotor shaft 34.

The tolerance ring 54 is designed such that slip occurs between the inner circumferential surface of the annular portion 64 and the outer circumferential surface of the annular groove 56 of the output side rotary shaft 32 and slip does not occur between the contact surface 70 of each of the outward protrusions 66 and the inner circumferential surface (an inner circumferential spigot surface 80 described below) of the rotor shaft 34. For example, the total area of the annular portion 64 of the tolerance ring 54 in contact with the output side rotary shaft 32 is larger than the total area of the contact surface 70 of each of the outward protrusion 66 of the tolerance ring 54 in contact with the rotor shaft 34.

In this way, the tolerance ring 54 is provided at a place at which the output side rotary shaft (first rotary shaft) 32 is inserted into the rotor shaft (second rotary shaft) 34 and which is different from the spline fitting portion 52. The tolerance ring 54 has the annular portion 64 in contact with the output side rotary shaft (first rotary shaft; one rotary shaft of the disclosure) 32 and the outward protrusions (protrusions) 66 in contact with the rotor shaft (second rotary shaft; the other rotary shaft of the disclosure) 34.

Returning to FIG. 4, inside the output side rotary shaft 32 in contact with the annular portion 64 of the tolerance ring 54, an axial direction oil passage 72 parallel to the axis C and a first radial direction oil passage 74 communicating the axial direction oil passage 72 and the annular groove 56 (annular space) are formed. In the output side rotary shaft 32, a second radial direction oil passage 75 communicating the axial direction oil passage 72 and a supply oil passage 73 formed in the case 12 is formed.

Figure 6:
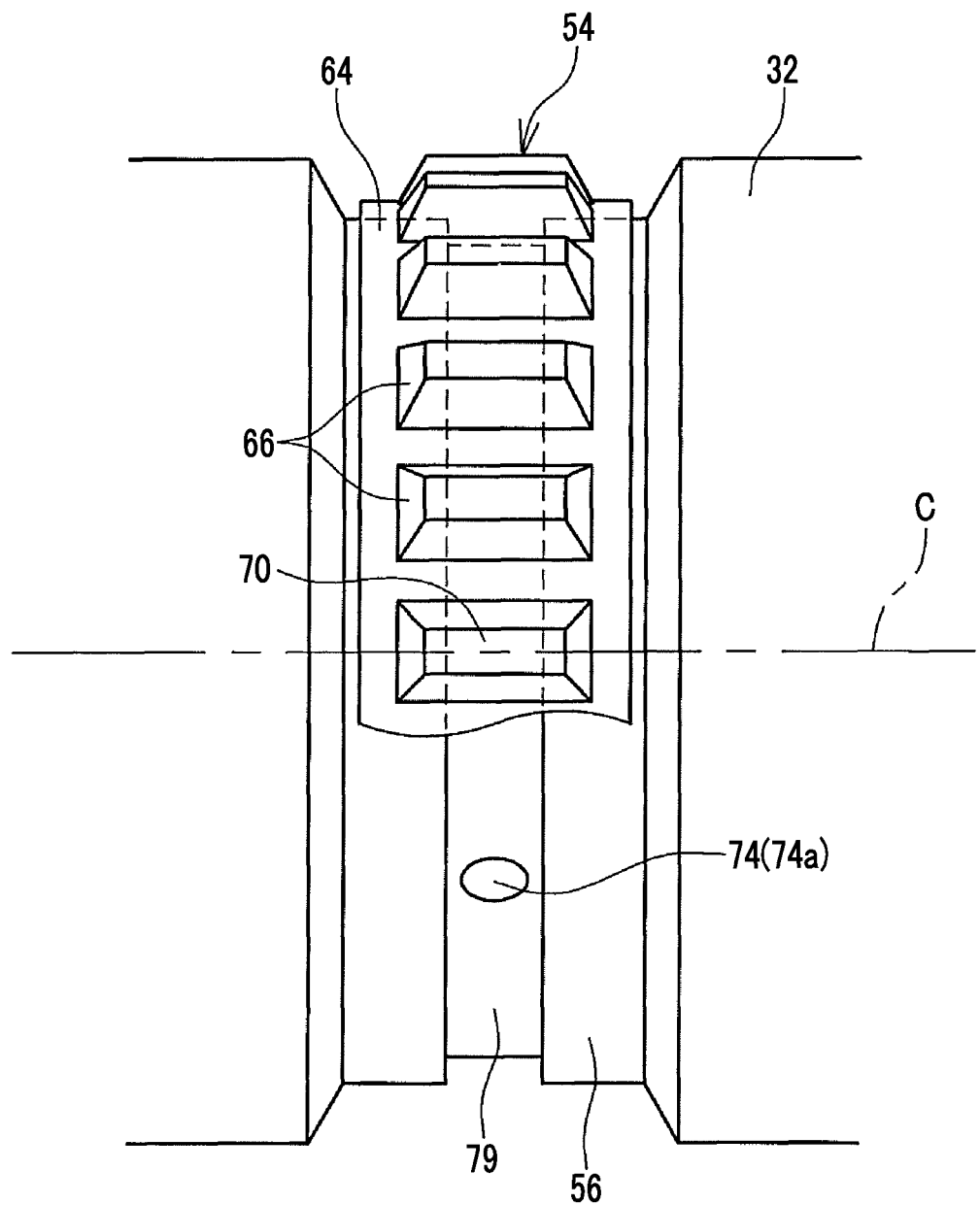
FIG. 6 is a diagram showing a mounting place of the tolerance ring in an output side rotary shaft on an enlarged scale.

As shown in FIG. 6 (a diagram showing a mounting place of the tolerance ring 54 in the output side rotary shaft 32 on an enlarged scale), this embodiment has a feature in that an oil supply groove 79 extending in the circumferential direction of the output side rotary shaft (the rotary shaft in contact with the annular portion 64 of the tolerance ring 54) 32 is provided at the bottom of the annular groove 56 over the whole circumference direction (the whole circumferential direction of the annular groove 56; the entire circumference) of the output side rotary shaft 32. The oil supply groove 79 is provided at the central position in the width direction (a direction along the axis C) of the annular groove 56, and has an opening 74a which is a downstream end of the first radial direction oil passage 74. The opening 74a corresponds to an oil supply hole (an oil supply hole for supplying a lubricant to the oil supply groove 79) of the disclosure. The width (dimension in the direction along the axis C) of the oil supply groove 79 is set to be smaller than the width of the bottom of the annular groove 56 and larger than the inner diameter of the opening 74a of the first radial direction oil passage 74. The oil supply groove 79 corresponds to a groove of the disclosure. The width (dimension in the direction along the axis C) of the oil supply groove 79 is set to be smaller than the width of each of the outward protrusions 66. With this, a part of the outer circumferential surface of the annular groove 56 faces the space formed on the rear side of each of the outward protrusions 66.

For this reason, the lubricant supplied from a hydraulic control circuit (not shown) to the supply oil passage 73 of the case 12 reaches the oil supply groove 79 through the second radial direction oil passage 75, the axial direction oil passage 72, and the first radial direction oil passage 74, and the oil supply groove 79 is filled with the lubricant. The supplied lubricant lubricates the tolerance ring 54 (lubricates the space between the annular portion 64 of the tolerance ring 54 and the outer circumferential surface of the annular groove 56 in the output side rotary shaft 32), cleans abrasion powder due to abrasion of the tolerance ring 54, or cools the tolerance ring 54. The lubricant lubricating the tolerance ring 54 passes through the notch 62 and is discharged through grooves 86 described below formed in the output side rotary shaft 32. The lubricant is also supplied to the space formed on the rear side of each of the outward protrusions 66 of the tolerance ring 54, and the space functions as a storage part of the lubricant.

Specifically, most of the lubricant supplied to the inside of the oil supply groove 79 flows into the space formed on the rear side of each of the outward protrusions 66 and lubricates the outer circumferential surface of the annular groove 56 facing the space. The annular portion 64 of the tolerance ring 54 is in contact with the outer circumferential surface of the annular groove 56. Then, as described below, in a case where the tolerance ring 54 slightly slides with respect to the output side rotary shaft 32, the outer circumferential surface of the annular groove 56 facing the space (the space into which the lubricant flows) relatively rotates (relatively rotates by an amount corresponding to slide) with respect to the tolerance ring 54. Then, the outer circumferential surface of the annular groove 56 not lubricated until then (not facing the lubricant) faces the space and is lubricated by the lubricant. Such slide is repeated, whereby most of the outer circumferential surface of the annular groove 56 is lubricated by the lubricant. That is, the space between the outer circumferential surface of the annular groove 56 and the inner circumferential surface of the annular portion 64 of the tolerance ring 54 is lubricated by the lubricant.

In this way, the oil supply groove (groove) 79 is provided in the surface of the output side rotary shaft 32 which is the rotary shaft in contact with the annular portion 64 of the tolerance ring 54 out of the output side rotary shaft (first rotary shaft) 32 and the rotor shaft (second rotary shaft) 34 (specifically, is provided in the surface of the annular groove 56 formed in the output side rotary shaft 32). The lubricant is supplied to a region in the output side rotary shaft 32 with the annular portion 64 of the tolerance ring 54 in contact.

In the output side rotary shaft 32, a first outer circumferential spigot surface 76 is formed between the outer circumferential tooth 40 and the annular groove 56 accommodating the tolerance ring 54 in the direction of the axis C. In the output side rotary shaft 32, a second outer circumferential spigot surface 78 is formed at a position on a side (in FIG. 4, the right side) opposite to the position of the first outer circumferential spigot surface 76 with respect to the annular groove 56 in the direction of the axis C. That is, the tolerance ring 54 is arranged between the first outer circumferential spigot surface 76 and the second outer circumferential spigot surface 78 in the direction of the axis C.

On the inner circumference side of the rotor shaft 34, an inner circumferential spigot surface 80 which is fitted to the first outer circumferential spigot surface 76 and the second outer circumferential spigot surface 78 after assembling is formed. The inner circumferential spigot surface 80 is set to have a length capable of being fitted to the first outer circumferential spigot surface 76 and the second outer circumferential spigot surface 78 in the direction of the axis C after assembling.

If the first outer circumferential spigot surface 76 and the inner circumferential spigot surface 80 are fitted, the dimension of the first outer circumferential spigot surface 76 and the dimension (dimensional tolerance) of the inner circumferential spigot surface 80 are set such that the first outer circumferential spigot surface 76 and the inner circumferential spigot surface 80 are fitted without a backlash. If the second outer circumferential spigot surface 78 and the inner circumferential spigot surface 80 are fitted, the dimension of the second outer circumferential spigot surface 78 and the dimension (dimensional tolerance) of the inner circumferential spigot surface 80 are set such that the second outer circumferential spigot surface 78 and the inner circumferential spigot surface 80 are fitted without a backlash. In FIG. 4, a portion where the first outer circumferential spigot surface 76 and the inner circumferential spigot surface 80 are fitted is defined as a first spigot joint 82, and a portion where the second outer circumferential spigot surface 78 and the inner circumferential spigot surface 80 are fitted is defined as a second spigot joint 84.

Both of the first spigot joint 82 and the second spigot joint 84 have the same dimensional relationship. That is, the outer diameters of the first outer circumferential spigot surface 76 and the second outer circumferential spigot surface 78 are equal to each other, and are also equal to the diameter of the hole of the inner circumferential spigot surface 80. The first spigot joint 82 and the second spigot joint 84 are formed on both sides of the tolerance ring 54 in the direction of the axis C. Since the first spigot joint 82 and the second spigot joint 84 have high airtightness, the lubricant is easily accumulated in the annular space formed by the annular groove 56 of the output side rotary shaft 32.

The first spigot joint 82 and the second spigot joint 84 are configured as above, whereby it is possible to prevent misalignment of the output side rotary shaft 32. For this reason, it is possible to reduce an eccentric load of the tolerance ring 54 caused by misalignment.

Figure 7:
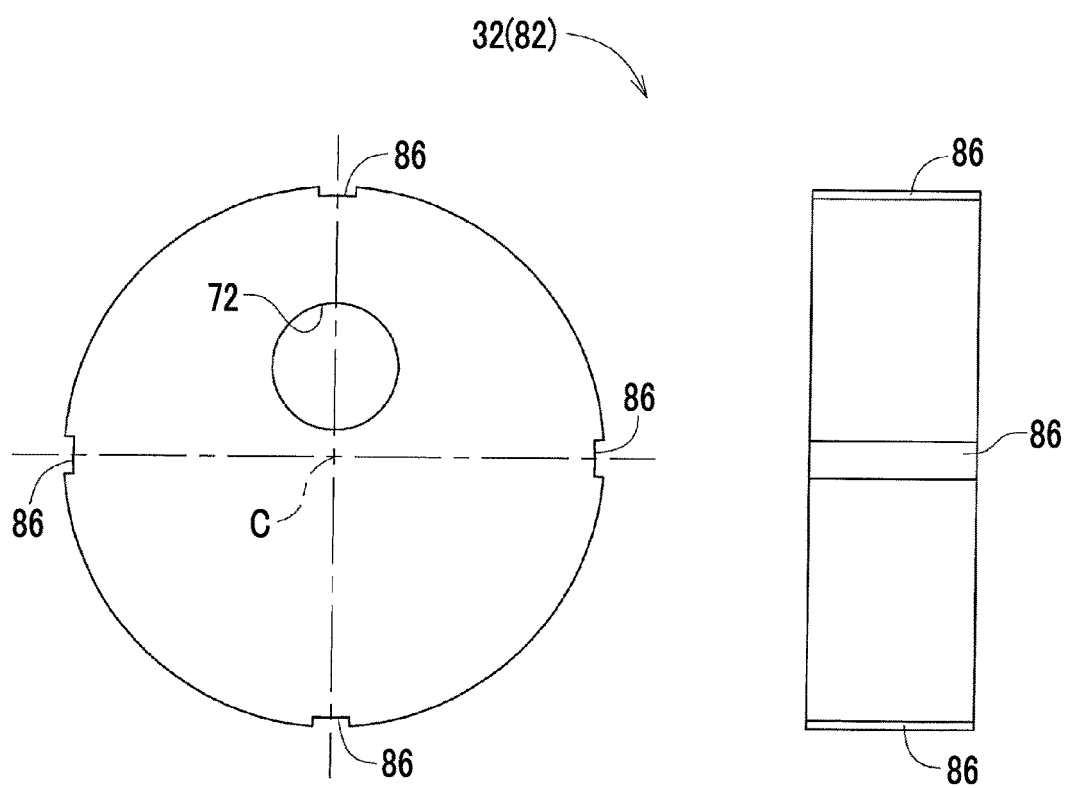
FIG. 7 is a sectional view of a first spigot joint taken along the line A-A in FIG. 4 and a diagram of the first spigot joint when viewed from the outside in a radial direction.

The left side of FIG. 7 is a sectional view of the first spigot joint 82 taken along the line A-A in FIG. 4. The right side of FIG. 7 is a diagram of the first spigot joint 82 when viewed from the outside in a radial direction. As shown in FIG. 7, if the first outer circumferential spigot surface 76 is viewed in the direction of the axis C, in the first outer circumferential spigot surface 76, a plurality (in this embodiment, four) of grooves 86 parallel to the axis C passing through both sides in the direction of the axis C are formed equiangularly. The grooves 86 are formed in the first outer circumferential spigot surface 76, whereby a clearance is formed in the first spigot joint 82 and the clearance functions as a lubricant discharge port in the annular space. That is, the lubricant supplied to the tolerance ring 54 through the axial direction oil passage 72, the first radial direction oil passage 74, and the oil supply groove 79 is discharged through the grooves 86 after lubricating the tolerance ring 54.

The tolerance ring 54 is compressed and deformed between the output side rotary shaft 32 and the rotor shaft 34 after assembling, and pressing force for vertically pressing each other of the surfaces between the contact surfaces of the output side rotary shaft 32 and the tolerance ring 54 and the contact surfaces of the rotor shaft 34 and the tolerance ring 54 therebetween is generated. Since frictional resistance is generated based on the generated pressing force and a friction coefficient between the contact surfaces, the rotor shaft 34 and the output side rotary shaft 32 are held by the tolerance ring 54 in the circumferential direction without a backlash. Accordingly, even in a state in which a backlash is not eliminated in the spline fitting portion 52, the rotor shaft 34 and the output side rotary shaft 32 are held by the tolerance ring 54 without a backlash. Therefore, rattling noise which is generated in the spline fitting portion 52 is suppressed.

The tolerance ring 54 repeatedly slightly slides (for example, slides in the rotation direction within a range in which a backlash is not eliminated) with respect to the output side rotary shaft 32 due to fluctuation in torque transmitted from the rotor shaft 34 of the second electric motor MG2 to the output side rotary shaft 32. For example, in a traveling state in which a traveling drive power required for a vehicle is small, or the like, a case where the torque transmitted to the output side rotary shaft 32 through the rotor shaft 34 of the second electric motor MG2 slightly fluctuates due to slight fluctuation in engine torque, or the like is exemplified. Even in a situation in which slight slide of the tolerance ring 54 is repeated, in this embodiment, as described above, the oil supply groove 79 is formed in the output side rotary shaft 32 (the annular groove 56 formed in the output side rotary shaft 32) with the annular portion 64 of the tolerance ring 54 in contact, whereby the lubricant is supplied between the annular portion 64 of the tolerance ring 54 and the output side rotary shaft 32. For this reason, it is possible to suppress abrasion of the annular portion 64 of the tolerance ring 54, and to suppress degradation of the durability of the tolerance ring 54. That is, it is possible to suppress degradation of the durability of the tolerance ring 54 without performing special processing for forming an oil supply hole in the tolerance ring 54, or the like. For this reason, it is possible to suppress degradation of the durability of the tolerance ring 54 without causing shortage of rigidity of the tolerance ring 54 or adversely affecting the function (the function of regulating the relative rotation of the rotor shaft 34 and the output side rotary shaft 32) of the tolerance ring 54.

According to this embodiment, since the oil supply groove 79 is provided over the whole circumferential direction of the output side rotary shaft 32, the lubricant can be supplied between the annular portion 64 of the tolerance ring 54 and the output side rotary shaft 32 over a wide range in the circumferential direction of the tolerance ring 54. For this reason, it is possible to sufficiently exert the effect of suppressing abrasion of the annular portion 64 of the tolerance ring 54, and to reliably suppress degradation of the durability of the tolerance ring 54.

According to this embodiment, the notch 62 is formed in a part in the circumferential direction in a state of being fitted to the outer periphery of the output side rotary shaft 32, and the notch 62 functions as a discharge port of the lubricant supplied between the tolerance ring 54 and the output side rotary shaft 32. For this reason, discharging of foreign substances, such as abrasion powder, from the notch 62 is effectively performed, and cooling of the tolerance ring 54 is satisfactorily performed by the flow of the lubricant. With this, it is also possible to suppress degradation of the durability of the tolerance ring 54.

According to this embodiment, the first radial direction oil passage 74 is formed in the output side rotary shaft 32 with the annular portion 64 of the tolerance ring 54 in contact, whereby the lubricant is also supplied to the space formed on the rear side of each of the outward protrusion 66 of the tolerance ring 54. Accordingly, it is possible to make the space function as a storage part of the lubricant.

According to this embodiment, since the grooves 86 are formed in the first spigot joint 82 functioning as a lubricant discharge port, the lubricant reaching the first spigot joint 82 is discharged through the grooves 86, and dischargeability of the lubricant is improved. With this, the cooling performance of the tolerance ring 54 is improved.

Next, a first modification example will be described. The modification example is a modification example of the first radial direction oil passage (the oil passage communicating the axial direction oil passage 72 and the oil supply groove 79) 74, and since other configurations are the same as those in the above-described embodiment, the first radial direction oil passage 74 will be primarily described.

In the above-described embodiment, the opening 74a of the first radial direction oil passage 74 is formed only at one place. In contrast, in this modification example, first radial direction oil passages 74 are formed at two places, and openings 74a which are formed in the oil supply groove 79 are formed at two places. For example, the first radial direction oil passages 74, 74 which communicate the axial direction oil passage 72 and the oil supply groove 79 are formed at respective positions phase-shifted by 180° in the circumferential direction of the output side rotary shaft 32, and the openings 74a, 74a are formed at respective positions phase-shifted by 180°. For example, at a position phase-shifted by 180° with respect to the forming position of the opening 74a of one first radial direction oil passage 74 shown in FIG. 6 (the oil supply groove 79 provided on the deep side in FIG. 6), the opening 74a of the other first radial direction oil passage 74 is formed. That is, while the notch 62 of the tolerance ring 54 is formed at one place, the first radial direction oil passages 74 (the openings 74a of the first radial direction oil passages 74) are formed at two places. This configuration corresponds to "the number of oil supply holes for supplying the lubricant to the groove is larger than the number of notches of the tolerance ring" of the disclosure.

In this way, if the openings 74a of the first radial direction oil passages 74 are formed at two places, in a case where the position of the notch 62 of the tolerance ring 54 overlaps the forming position of the opening 74a of one first radial direction oil passage 74, the lubricant which is supplied from the first radial direction oil passage 74 may not be supplied to the oil supply groove 79 and may be discharged from the notch 62. However, since the number (in this modification example, two) of openings 74a of the first radial direction oil passages 74 is larger than the number (in this modification example, one) of notches 62, the forming position of the opening 74a of the other first radial direction oil passage 74 does not overlap the position of the notch 62. For this reason, the lubricant supplied from the first radial direction oil passage (the first radial direction oil passage not overlapping the position of the notch 62) 74 is satisfactorily supplied to the oil supply groove 79. For this reason, even if the tolerance ring 54 is misaligned in the circumferential direction with respect to the output side rotary shaft 32, it is possible to supply the lubricant between the annular portion 64 of the tolerance ring 54 and the output side rotary shaft 32, and to suppress abrasion of the annular portion 64 of the tolerance ring 54. When assembling the tolerance ring 54 in the output side rotary shaft 32, an operation to assemble while confirming such that the position of the notch 62 does not overlap the position of the first radial direction oil passage 74 is not required, and assembling operability is improved.

Next, a second modification example will be described. In the modification example, the configuration of an oil supply groove provided in the output side rotary shaft 32 is different from that in the above-described embodiment. Since other configurations are the same as those in the above-described embodiment, the configuration of the oil supply groove will be primarily described.

In the above-described embodiment, the oil supply groove 79 extends in the circumferential direction of the output side rotary shaft 32. In contrast, in this modification example, as shown in FIG. 8 (the left side is a sectional view of the output side rotary shaft 32, and the right side is a diagram of the output side rotary shaft 32 when viewed from the outside in the radial direction; the tolerance ring 54 is indicated by a virtual line), oil supply grooves 79A extend in a direction along the axis C, and a plurality of oil supply grooves 79A are provided intermittently over the circumferential direction.

Figure 8:
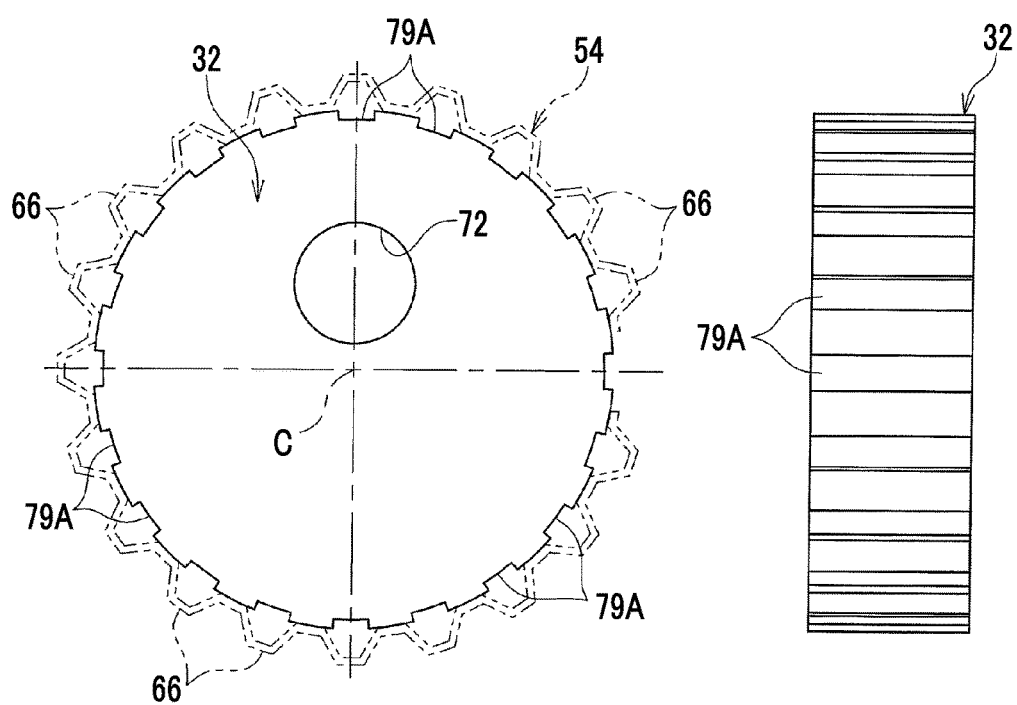
FIG. 8 is a sectional view of an output side rotary shaft in a second modification example and a diagram of the output side rotary shaft when viewed from the outside in a radial direction.

As shown in FIG. 8, a plurality of oil supply grooves 79A in this modification example are provided at multiple places with the same pitch as the circumferential pitch of the outward protrusions 66 over the circumferential direction. For this reason, the lubricant supplied to the oil supply grooves 79A is supplied to the rear sides of the outward protrusions 66 respectively, and the lubricant is supplied between the annular portion 64 of the tolerance ring 54 and the output side rotary shaft 32. In this example, as a configuration for supplying the lubricant to the respective oil supply grooves 79A, for example, a configuration in which a plurality of radial direction oil passages (radial direction oil passages communicating the axial direction oil passage 72 and the respective oil supply grooves 79A) corresponding to the respective oil supply grooves 79A are provided is exemplified.

In this modification example, as in the above-described embodiment, even if a situation in which the tolerance ring 54 repeatedly slightly slides with respect to the output side rotary shaft 32 is caused, it is possible to suppress abrasion of the annular portion 64 of the tolerance ring 54, and to suppress degradation of the durability of the tolerance ring 54. That is, it is possible to suppress degradation of the durability of the tolerance ring 54 without performing special processing for forming an oil supply hole in the tolerance ring 54, or the like. For this reason, it is possible to suppress degradation of the durability of the tolerance ring 54 without causing shortage of rigidity of the tolerance ring 54 or adversely affecting the function (the function of regulating the relative rotation of the rotor shaft 34 and the output side rotary shaft 32) of the tolerance ring 54.

Next, a third modification example will be described. The modification example is a modification example of a tolerance ring, and since other configurations are the same as those in the above-described embodiment, the configuration of the tolerance ring will be primarily described.

Figure 9:
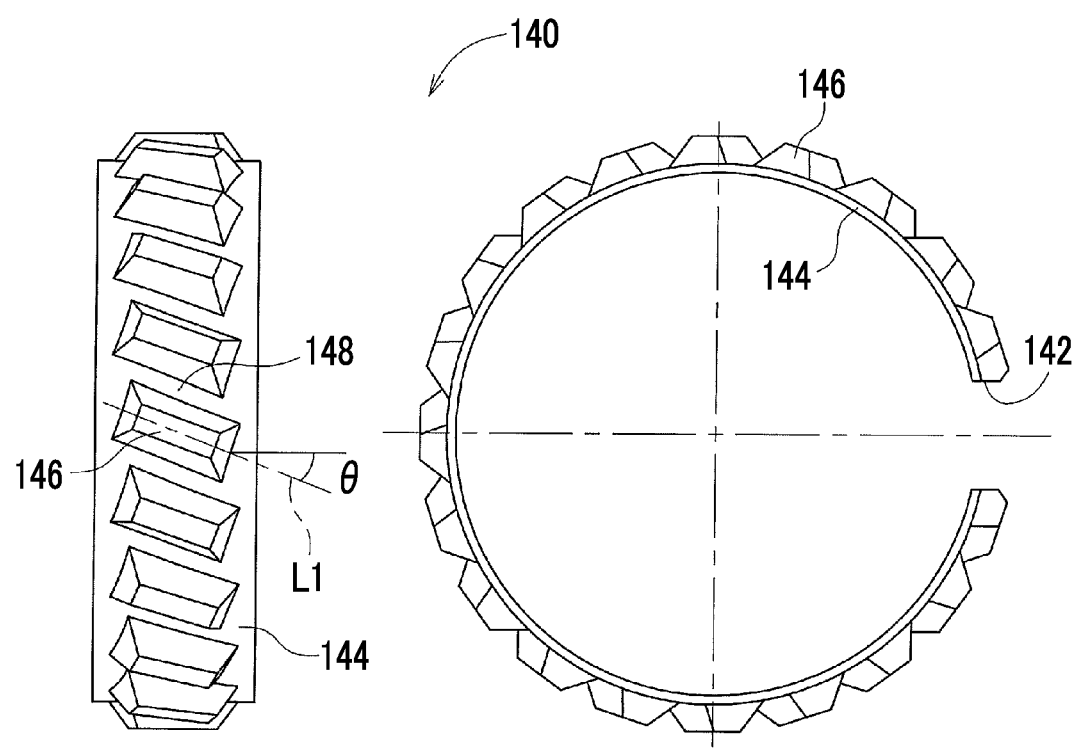
FIG. 9 is a diagram showing the shape of a tolerance ring in a third modification example.

FIG. 9 shows a shape of a tolerance ring 140 according to this modification example. The tolerance ring 140 is made of a metal (for example, spring steel), and is formed in a substantially annular shape having a notch 142 in a part in the circumferential direction. The tolerance ring 140 includes an annular portion 144 formed in a substantially annular shape and a plurality of outward protrusions 146 protruding from the annular portion 144 to the outside in the radial direction. The outward protrusions 146 are arranged at the center in a width direction (in a left view of FIG. 9, a right-left direction) of the annular portion 144. The outward protrusions 146 are arranged equiangularly in the circumferential direction, and a flat surface 148 is formed between adjacent outward protrusions 146 in the circumferential direction. The flat surface 148 functions as a part of the annular portion 144.

As shown in FIG. 9, the outward protrusions 146 of this embodiment are formed in an oblique teeth shape when viewed from the outside in the radial direction. That is, the outward protrusions 146 are respectively arranged obliquely with respect to the width direction of the annular portion 144 when viewed from the outside in the radial direction. Specifically, when the outward protrusions 146 are viewed from the outside in the radial direction, a center line L1 extending in parallel with a longitudinal direction of the outward protrusions 146 is inclined by a predetermined angle θ with respect to the width direction of the annular portion 144. The tolerance ring 140 is set such that the inner circumference side thereof slips and slip does not occur between the top surface of each of the outward protrusions 146 and the rotor shaft 34.

If the tolerance ring 140 is formed as described above, while the tolerance ring 140 rotates integrally with the output side rotary shaft 32, the lubricant supplied to the tolerance ring 140 is pushed out to the oblique surface inside each of the outward protrusions 146 and smoothly discharged. Other functional effects are the same as those in the above-described embodiment. The tolerance ring 140 of this modification example is applicable to the configurations of the respective modification examples.

Although the embodiment of the disclosure and the respective modification examples have been described in detail based on the drawings, the disclosure is also applied to other aspects.

For example, in the above-described embodiment and the respective modification example, although the power transmission device 10 is the hybrid type power transmission device 10 including the two electric motors MG1, MG2, the disclosure is not necessarily limited to the hybrid type power transmission device 10 of this embodiment and the respective modification examples. For example, the disclosure is applicable to a hybrid type power transmission device including one electric motor or a power transmission device including no electric motor. That is, the disclosure can be suitably applied if a power transmission device includes a spline fitting portion formed by spline-fitting a first rotary shaft and a second rotary shaft in a part of a power transmission path from a power source to drive wheels. For this reason, the disclosure is not limited to the spline fitting portion 52 of the rotor shaft 34 and the output side rotary shaft 32.

In the above-described embodiment and the respective modification examples, although the automatic transmission 20 is a stepped transmission including the four forward stages, the number of gear shift stages or the internal coupling configuration is not particularly limited. Instead of the stepped automatic transmission 20, for example, a continuously variable transmission including a belt type continuously variable transmission may be applied.

In the above-described embodiment and the respective modification examples, the flow passage for supplying the lubricant to the tolerance ring 54 is formed in the output side rotary shaft 32. However, in a case where a tolerance ring having protrusions toward an inner circumference side is applied, since the annular portion of the tolerance ring is in contact with the inner circumferential surface of the rotor shaft 34, an oil supply groove or an oil passage is formed in the rotor shaft 34.

Various configurations described above are merely an embodiment, and the disclosure can be carried out in aspects to which various modifications and improvements are added based on knowledge of those skilled in the art.

The disclosure is applicable to the configuration of a rotary shaft in which a tolerance ring for suppressing rattling noise is mounted.

What is claimed is:

1. A power transmission device for a vehicle, the power transmission device comprising:
   a first rotary shaft;
   a second rotary shaft;
   a spline fitting portion configured to spline-fit the first rotary shaft and the second rotary shaft in a part of a power transmission path from a power source to a drive wheel; and
   a tolerance ring provided at a place at which the first rotary shaft is inserted into the second rotary shaft and which is different from the spline fitting portion,
   the tolerance ring including an annular portion formed in a substantially annular shape and a plurality of protrusions protruding from the annular portion,
   the annular portion being configured to come into contact with one of the first rotary shaft and the second rotary shaft, and the one of the first rotary shaft and the second rotary shaft being provided with a groove, oil supply holes, and an axial direction oil passage,
   the protrusions being configured to come into contact with other one of the first rotary shaft and the second rotary shaft,
   the axial direction oil passage being configured to supply a lubricant from outside of the one of the first rotary shaft and the second rotary shaft to the oil supply holes,
   the oil supply holes are configured to supply the lubricant to the groove,
   the groove being configured to supply the lubricant to a region of the tolerance ring where the annular portion comes into contact, and
   the tolerance ring has at least one notch in a part in the circumferential direction for discharging the lubricant supplied to the region of the tolerance ring where the annular portion comes into contact.

2. The power transmission device according to claim 1, wherein the groove extends along a circumferential direction of the one of the first rotary shaft and the second rotary shaft.

3. The power transmission device according to claim 2, wherein the groove is provided over the entire circumference in the circumferential direction of the one of the first rotary shaft and the second rotary shaft.

4. The power transmission device according to claim 3, wherein the number of the oil supply holes is larger than the number of the at least one notch of the tolerance ring.

* * * * *